(12) United States Patent
Maguire (10) Patent No.: US 11,076,297 B2
(45) Date of Patent: Jul. 27, 2021

(54) MANAGING NETWORK SLICES IN A COMMUNICATIONS NETWORK

(71) Applicant: Telefonaktiebolaget LM Ericsson (publ), Stockholm (SE)

(72) Inventor: Patrick Maguire, Athlone (IE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 16/771,352

(22) PCT Filed: Dec. 19, 2017

(86) PCT No.: PCT/EP2017/083543
§ 371 (c)(1),
(2) Date: Jun. 10, 2020

(87) PCT Pub. No.: WO2019/120485
PCT Pub. Date: Jun. 27, 2019

(65) Prior Publication Data
US 2020/0314656 A1    Oct. 1, 2020

(51) Int. Cl.
*H04W 16/02* (2009.01)
*H04W 24/02* (2009.01)

(52) U.S. Cl.
CPC ........... *H04W 16/02* (2013.01); *H04W 24/02* (2013.01)

(58) Field of Classification Search
CPC .............................. H04W 16/02; H04W 24/02

USPC ........................................................ 455/450
See application file for complete search history.

(56) References Cited

U.S. PATENT DOCUMENTS

2010/0210255 A1    8/2010  Amirijoo et al.
2017/0079059 A1    3/2017  Li et al.

FOREIGN PATENT DOCUMENTS

WO      2019048048 A1    3/2019

OTHER PUBLICATIONS

El Hattachi, Rachid, et al., "NGMN 5G White Paper", A Deliverable by the NGMN Alliance, Version 1.0, Feb. 17, 2015, pp. 1-125.

*Primary Examiner* — Joel Ajayi
(74) *Attorney, Agent, or Firm* — Murphy, Bilak & Homiller, PLLC (57) ABSTRACT

There is described a method of managing network slices in a communications network. The method comprises a domain manager of a Radio Access Network (RAN) determining a change in cell composition of the RAN, and determining neighbor cells within the RAN affected by the change in cell composition of the RAN. The method also compromises the domain manager determining a set of RAN resource partitions affected by the change in cell composition of the RAN, and adapting the configuration of RAN resource partitions of the set of RAN resource partitions by introducing changes corresponding to the change in cell composition of the RAN.

13 Claims, 8 Drawing Sheets

MANAGING NETWORK SLICES IN A COMMUNICATIONS NETWORK

TECHNICAL FIELD

The present invention relates to a domain manager for a Radio Access Network (RAN) of a communications network and to a method of managing network slices in a communications network.

BACKGROUND

As communications networks evolve, the number of services provided also grows. By way of example, the services provided by a communication network have evolved from a simple voice communication at the very beginning to voice and data communication, including texting, email, web browsing, video transmission and others in 4G (4th Generation) wireless networks. A further increase in the number of services can be expected for future 5G (5th Generation) wireless networks. When looking at the wide range of applications and services to be provided by a 5G network, it is quite obvious that these cannot effectively be addressed with a traditional approach of having a purpose-built network for each application. This would lead to high cost for networks and devices as well as inefficient use of valuable frequency resources. An operator may have one physical network infrastructure and one pool of frequency bands, which may support many separate virtualized networks, also called network slices. Each network slice may have unique characteristics for meeting the specific requirements of the use case(s) it serves. The key driver for introducing network slicing is business expansion, i.e., improving a network operator's ability to serve other industries, e.g., by offering connectivity services with different network characteristics (performance, security, robustness, and complexity). Network slicing may be applied to a 4G network, e.g., based on the LTE (Long Term Evolution) technology specified by 3GPP, or to a 5G network, e.g., based on the NR (New Radio) technology currently developed by 3GPP.

Network slicing typically involves creating logically separated partitions of the network, which may address different business purposes. These network slices are logically separated to a degree that they can be regarded and managed as networks of their own. Network slices can be associated with different slice tenants, namely entities that provide services to the end user via the network slice. Examples of slice tenants could be:
- armed forces providing, e.g., voice communication, via a dedicated network slice;
- vehicles manufacturers providing, e.g., vehicle diagnostic services, via a dedicated network slice.

It is also common to associate a Service Level Agreement (SLA) to each network slice. Such SLA may for example indicate the treatment to which services provided within the network slice should be subjected.

A current working assumption for network slicing is that there will be one shared Radio Access Network (RAN) infrastructure that will connect to several Core Network (CN) instances, such as Evolved Packet Core (EPC) instances (one EPC instance per network slice) or a further EPC evolution.

When using one physical RAN used for multiple network slices, two aspects should be taken into account. The first aspect is that network slicing should make it possible to support several different virtual networks on the same physical network infrastructure in order to reduce costs and energy consumption compared to deploying separate physical networks for the different use cases or business scenarios. In order to exploit this benefit fully, it is required that the slicing concept allows for efficient usage of common resources such as radio resources and infrastructure, and transport links between the slices such as fronthaul and backhaul. The second aspect is that mechanisms are required to protect common channels or resources used for UEs (user equipments) accessing the system so that congestion in one slice does not have a negative impact on another slice (often called slice isolation).

In view of slice isolation, it may be necessary to implement resource isolation in RAN, which may be achieved by resource partitioning. RAN resource partitioning may involve dividing up the full radio resource allocation into maximum of six RAN resource partitions (the number of RAN resource partitions may be extended to 32 in the future). The operator will be given parameters to control whether the RAN resource partition is based on Public Land Mobile Network (PLMN) or Subscriber Profile Identity (SPID), and then control how many resources each RAN resource partition shall be given. A RAN resource partition may include multiple cells and multiple access nodes, e.g., eNBs of the LTE technology or 5G access nodes.

Management of RAN partitions may be based on an abstract representation of the RAN, including for example coverage areas of cells or access nodes. A corresponding abstract topology representation of the RAN may be created manually and then be stored in a NMS (Network Management System) which is responsible for configuration and instantiation of the network slices.

At instantiation of a network slice, a customer may request a certain radio coverage. The NMS may determine the required radio coverage and identify which network elements (e.g., cells or access nodes) of the abstract RAN topology are needed to meet the customer's coverage requirement.

RANs are subject to periodic reconfigurations, for example to add or remove a cell or access node from the RAN. In relation to changes in radio deployment, there may be many driving factors for adding or removing a cell from the RAN although the primary reason is changing demands on the network capacity. Assuming the reason for change is capacity growth, as an existing cell experiences growth in its traffic load, its effective coverage area decreases. If additional cells are not deployed to address this increase in demand on network capacity, "white spots" in network coverage will appear. Such white spots often result in breaches of SLAs.

In an operator's process, it is usually the radio design/optimization team who will trigger a change in radio deployment though the addition or removal of a cell from the RAN, via interaction with operation supports systems for the required re-configuration of the RAN. In order to meet the evolving requirements on network management in a 5G context, there is now a need to be able to deploy and manage logical networks (i.e. network slices) for a particular business purpose. This deployment must be able to tolerate changes to the radio deployment throughout the complete lifecycle of a network slice, for example because of the potential impact on a network slice arising from the addition or removal of a cell from the RAN.

Accordingly, there is a need for techniques which allow for efficient management of network slices of the RAN with respect to configurations of RAN resource partitions of the network slices that allows for the addition and removal of cells from the RAN.

SUMMARY

There is provided a method of managing network slices in a communications network. The method comprises a domain manager of a RAN determining a change in cell composition of the RAN. The method further comprises the domain manager determining neighbor cells within the RAN affected by the change in cell composition of the RAN. The method further comprises the domain manager determining a set of RAN resource partitions affected by the change in cell composition of the RAN. The method further comprises the domain manager adapting the configuration of RAN resource partitions of the set of RAN resource partitions by introducing changes corresponding to the change in cell composition of the RAN. The configuration of a RAN resource partition defines the network elements of the RAN that are assigned to the RAN resource partition of a network slice.

There is also provided a domain manager configured to perform any of the methods described herein including the method set out in the preceding paragraph. Hence, there is also provided a domain manager for a RAN of a communications network. The domain manager is configured to determine a change in cell composition of the RAN, and to determine neighbor cells within the RAN affected by the change in cell composition of the RAN. The domain manager is also configured to determine a set of RAN resource partitions affected by the change in cell composition of the RAN. The domain manager is also configured to adapt the configuration of RAN resource partitions of the set of RAN resource partitions by introducing changes corresponding to the change in cell composition of the RAN. A configuration of a RAN resource partition defines the network elements of the RAN that are assigned to the RAN resource partition of a network slice.

There is also provided a device for management of a RAN of a communications network, the device comprising processing circuitry and a memory containing instructions executable by said processing circuitry. The device is operative to perform any of the methods described herein, including the method described above. Hence, for example, the device is operative to determine a change in cell composition of the RAN. The device is also operative to determine neighbor cells within the RAN affected by the change in cell composition of the RAN. The device is also operative to determine a set of RAN resource partitions affected by the change in cell composition of the RAN. The device is also operative to adapt the configuration of RAN resource partitions of the set of RAN resource partitions by introducing changes corresponding to the change in cell composition of the RAN. A configuration of a RAN resource partition defines the network elements of the RAN that are assigned to the RAN resource partition of a network slice.

There is also provided a domain manager for a RAN of a communications network that comprises the following modules.

A module for determining a change in cell composition of the RAN.
A module for determining neighbor cells within the RAN affected by the change in cell composition of the RAN.
A module for determining a set of RAN resource partitions affected by the change in cell composition of the RAN.
A module for adapting the configurations of RAN resource partitions of the set of RAN resource partitions by introducing changes corresponding to the change in cell composition of the RAN, wherein a configuration of a RAN resource partition defines the network elements of the RAN that are assigned to the RAN resource partition of a network slice.

There is also provided a computer program comprising instructions which, when executed on processing circuitry, cause the processing circuitry to carry out any of the methods described herein including the methods described above. There is also provided a carrier containing such a computer program, wherein the carrier is one of an electronic signal, optical signal, radio signal or computer readable storage medium. There is also provided a computer readable storage medium having stored thereon such a computer program.

DETAILED DESCRIPTION

In the following, concepts in accordance with exemplary embodiments of the invention will be explained in more detail and with reference to the accompanying drawings. The illustrated embodiments relate to management of network slices in a wireless communication network. Specifically, the embodiments relate to concepts for adapting and optimizing the configurations of RAN resource partitions of network slices that account for changes in cell composition of the RAN, for example the addition or removal of a cell. The wireless communication network may be, for example, based on a 4G technology, such as the LTE technology specified by 3GPP, or a 5G radio technology, e.g., the NR technology currently developed by 3GPP.

In the illustrated examples, configurations of RAN resource partitions may be automatically adapted by introducing changes corresponding to the change in cell composition of the RAN. The change in cell composition of the RAN may correspond to the addition of a new cell to the RAN or to the removal of an unwanted cell from the RAN.

A new cell may be added to the RAN because existing cells have experienced a growth in traffic load such that their effective coverage area decreases thereby risking "white spots" in network coverage appearing. Configurations of the RAN resource partitions may be automatically adapted by introducing changes corresponding to the addition of a new cell to the RAN by assigning a network element of the new cell to the configurations of RAN resource partitions to which neighbor cells are assigned.

An unwanted cell is merely a cell that is to be or has been removed from a RAN, for whatever reason. The removal of the unwanted cell may be a physical removal, or it may be just a functional removal (for example, blocking the cell from use by the RAN). For example, the unwanted cell may be removed from the RAN because there is good or adequate coverage provided by neighboring cells (i.e. the unwanted cell may still carry traffic because it is present and available for use but, by removing the unwanted cell, the traffic will be taken over by the neighboring cells). Alternatively, the unwanted cell may be removed from the RAN because it has not been carrying any traffic over a period of time or the amount of traffic carried by the unwanted cell is below certain threshold. Configurations of the RAN resource partitions may be automatically adapted by introducing changes corresponding to the removal of an unwanted cell from the RAN by assigning network elements of neighbor cells to the configuration of one or more RAN resource partitions to which an unwanted cell was previously assigned.

After adapting the configurations of the RAN resource partitions, the network slices may then be optimized on the basis of reports indicating an amount of network slice traffic handled by network elements (e.g., cells, of the RAN resource partitions used by the network slices). Cells or other network elements for which the reports indicate that there was no network slice traffic in a certain observation time window may be removed from the configuration of the RAN resource partition for that network slice. In this way, radio coverage of RAN resource partitions may be adjusted to include only those network elements which are actually required, e.g., to meet a customer request, but without seeing a breach in a SLA for that network slice. An initial oversize of the RAN resource partition upon adaptation to account for the change in cell composition in the RAN is thus not critical, which in turn facilitates initial configuration of the RAN resource partition. The subsequent optimization of the RAN network performed on the basis of the reports that indicate network traffic sees the oversized RAN resource partitions reduced in size to an optimized configuration.

Figure 1:
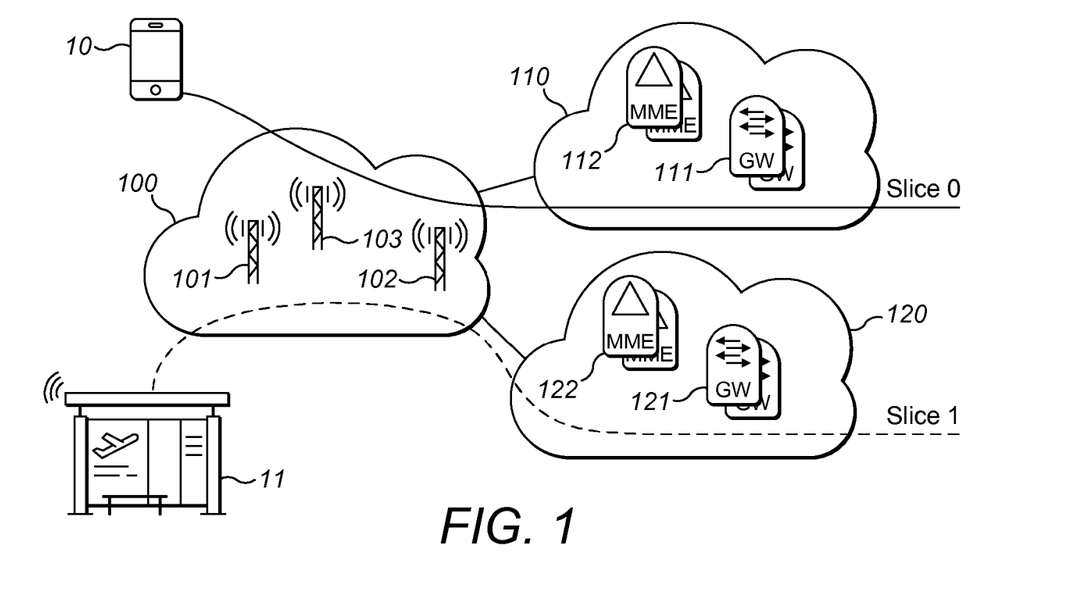
FIG. 1 schematically illustrates an example of network slices.

FIG. 1 schematically illustrates network slices as used in the illustrated concepts. More specifically, FIG. 1 illustrates a RAN 100 of the wireless communication network, a first CN instance 110 of the wireless communication network, and a second CN instance 120 of the wireless communication network. As illustrated, the RAN 100 includes multiple network elements 101, 102, 103. These network elements may correspond to cells and/or access nodes serving one or more cells. The first CN instance 110 includes CN nodes 111, 112, and the second CN instance 120 includes CN nodes 121, 122. The CN nodes 111, 112, 121, 122 of the respective CN instance 110, 120 may for example include one or more gateways (GWs) 111, 121, such as an SGW (Serving Gateway) or PGW (Packet Data Gateway) of the EPC. Further, the CN nodes 111, 112, 121, 122 may include one or more mobility management nodes, such as an MME (Mobility Management Entity) of the EPC. However, it is noted that the CN instances could additionally or alternatively also include gateways or mobility management nodes of a 5G technology, e.g., the NR technology.

The first CN instance 110 is assumed to be assigned to a first network slice, referred to as "Slice 0". The second CN instance 120 is assumed to be assigned to a second network slice, referred to as "Slice 1". Further, FIG. 1 also illustrates an exemplary UE 10 receiving or sending traffic via Slice 0 and an exemplary UE 11 receiving or sending traffic via Slice 1. Accordingly, the example of FIG. 1 assumes that there is a one to one mapping between network slice and CN instance. However, it is noted that the concepts explained herein would also be applicable to scenarios where multiple network slices are supported by the same CN instance. Further, it is noted that the different CN instances 110, 120 do not necessarily need to be implemented by separate physical hardware elements, but could also be implemented on the basis of different virtual CN nodes implemented by the same physical hardware element. For example, a GW 111 of the CN instance 110 and a GW 121 of the CN instance 120 could be implemented as virtual nodes on the same physical hardware element. Similarly, an MME 112 of the CN instance 110 and an MME 122 of the CN instance 120 could be implemented as virtual nodes on the same physical hardware element.

In the example of FIG. 1, the network slices may be used to support different services. For example, Slice 0 could be a Mobile Broadband slice, while Slice 1 could be a Machine Type Communication network slice. However, various other kinds of services could be supported as well. The network slices could also be associated with different tenants, e.g., different customers of an operator of the wireless communication network. Each of these different customers could have an individual SLA with the operator. The SLA could for example specify radio coverage offered to the customer.

As further illustrated, the RAN 100 of the wireless communication network is shared by both network slices. For this purpose, a corresponding RAN resource partition is configured for each of the network slices. Each of the network elements 101, 102, 103 of the RAN 100 may be assigned to the configuration of one of the RAN resource partitions, to the configurations of both RAN resource partitions, or to none of the RAN resource partitions.

Figure 2:
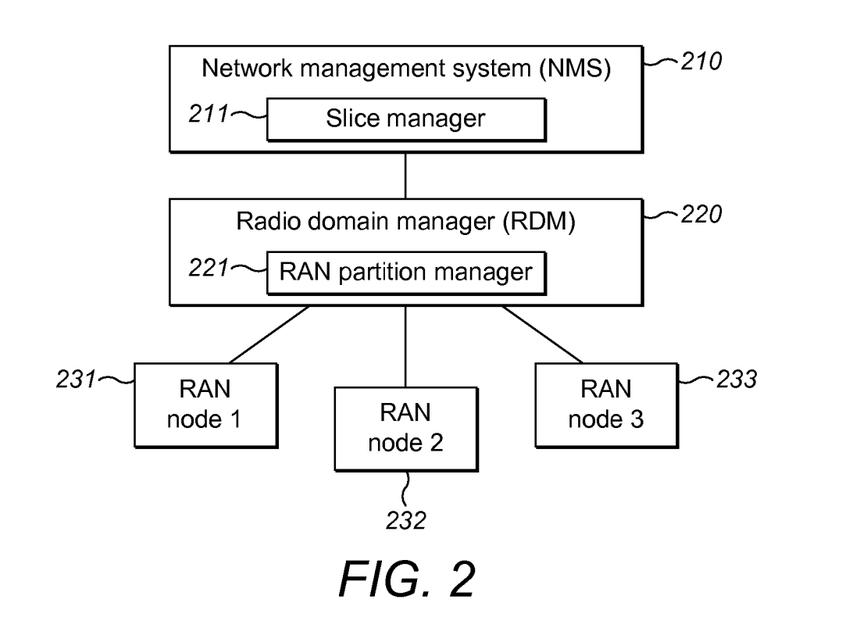
FIG. 2 schematically illustrates an example of a management architecture.

FIG. 2 schematically illustrates a management architecture which may be used for implementing the illustrated concepts. As illustrated, the management architecture includes an NMS 210, a Radio Domain Manager (RDM) 220, and multiple RAN nodes 231, 232, 233 controlled by the RDM 220. The RAN nodes 231, 232, 233 may for example include one or more access nodes which each serve one or more cells of the wireless communication network. Further, the RAN nodes 231, 232, 233 may include one or more control nodes, such as a Radio Control Function (RCF) of the NR technology. Each of the RAN nodes 231, 232, 233 may thus control one more cells of the RAN 100. Each of these cells may be assigned to the configuration of a certain RAN resource partition. The RAN nodes 231, 232, 233 may thus control one or more cells, i.e., network elements of the RAN resource partition. Further, if one of the RAN nodes 231, 232, 233 controls a cell of the RAN resource partition, this RAN node 231, 232, 233 will also constitute a network element assigned to the configuration of the RAN resource partition.

For managing the network slices configured in the wireless communication network, the NMS 210 includes a slice manager 211. The slice manager 211 may for example be responsible for network slice lifecycle management. In an initial phase, network slice lifecycle management may include, for example, preparation of a network slice, configuration of the network slice, instantiation of the network slice, and activation of the network slice. In a subsequent phase, network slice lifecycle management may include supervision of usage of the network slice and related reporting. This supervision and reporting may be used as a basis for reconfiguring the network slice, e.g., by scaling or upgrading. In a final phase, network slice lifecycle management may include deactivation and termination of the network slice.

For managing the RAN resource partitions, the RDM 220 includes a RAN partition manager 221. The RAN partition manager 221 may be, for example, responsible for RAN resource partition lifecycle management. In an initial phase, RAN resource partition lifecycle management may include, for example, preparation of a RAN resource partition for a network slice, configuration of the RAN resource partition, instantiation of the RAN resource partition, and activation of the RAN resource partition. In a subsequent phase, RAN resource partition lifecycle management may include supervision of usage of the RAN resource partition and related reporting, e.g., to the NMS 210. As further explained below, the supervision may include adapting the configurations of RAN resource partitions to account for changes in cell composition in the RAN 100. The supervision may also include receiving and analyzing reports from the RAN nodes 231, 232, 233. The reports may be used for optimization of the configurations of the RAN resource partitions. In a final phase, RAN resource partition lifecycle management may include deactivation and termination of the RAN resource partitions. In the following, an example of adapting the configurations of RAN resource partitions and optimizing the configurations of RAN resource partitions will be explained in more detail with reference to FIG. 3.

Figure 3:
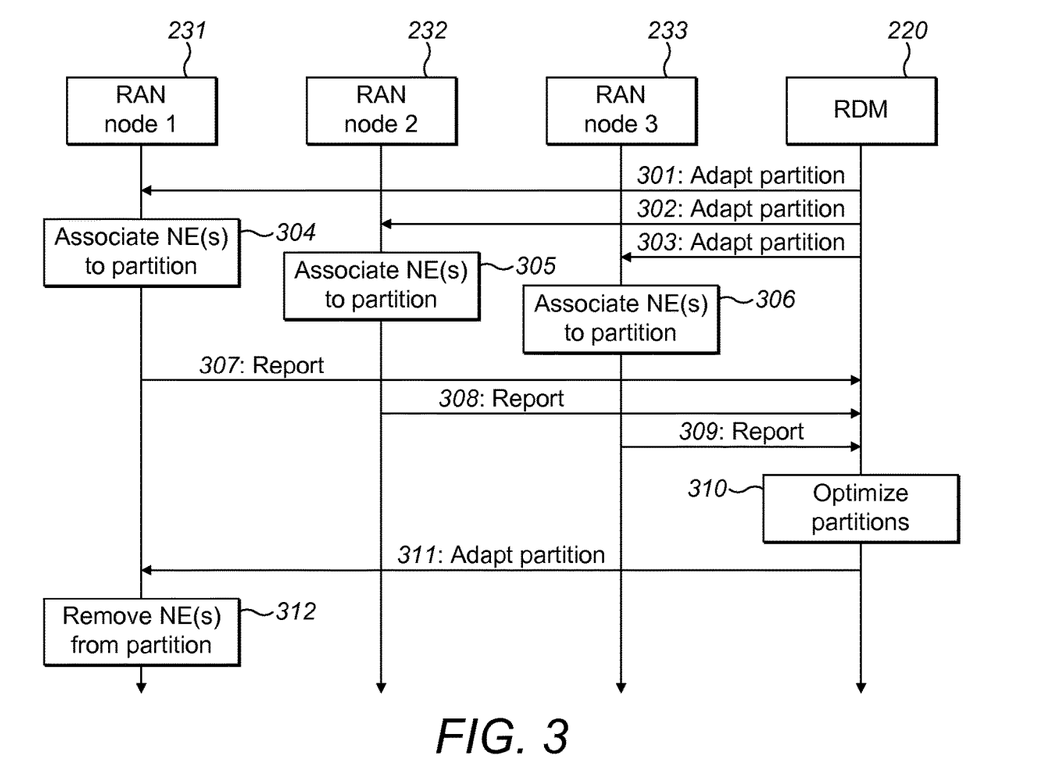
FIG. 3 illustrates an example of processes involving management of RAN resource partitions according to an embodiment of the invention.

The example of FIG. 3 involves the RDM 220 and the RAN nodes 231, 232, 233. Functionalities of the RDM 220 as explained in connection with FIG. 3 may for example be implemented by the RAN partition manager 221.

In an initial phase not shown in FIG. 3, the RDM 220 creates RAN resource partitions, e.g., by determining a configuration for each RAN resource partition that defines which cells are included in each RAN resource partition. The RAN resource partitions are assigned to certain respective network slices, e.g., one to each of the above-mentioned network slices although multiple network slices may use the same RAN resource partition. Creation of the RAN resource partitions may be performed automatically, but may also involve manual input from an operator. In the example of FIG. 3, it is assumed that the configurations of the RAN resource partitions include one or more cells controlled by the RAN node 231, one or more cells controlled by the RAN node 232, and one or more cells controlled by the RAN node 233.

By sending management messages to the RAN nodes 231, 232, 233, the RDM 220 instructs the RAN nodes 231, 232, 233 to associate these cells with configurations of the RAN resource partitions. The respective RAN node 231, 232, 233 may store locally that the cells indicated by the received management message are assigned to the configuration of the RAN resource partition indicated in the message and that the RAN node 231, 232, 233 itself is assigned to the configuration of the RAN resource partition. For this purpose, the RAN resource partition may be defined by a partition name and/or partition identifier. The partition identifier may be unique on the level of the respective RAN node 231, 232, 233, while the partition name may be unique across all RAN nodes 231, 232, 233 controlled by the RDM 220.

FIG. 3 shows the messages arising due to a change in cell composition of the RAN 100 that result in an adaptation of the configurations of the RAN resource partitions to account for the removal of an unwanted cell from the RAN 100. The RDM 220 sends further management messages (labeled 301, 302 and 303 in FIG. 3) to the RAN nodes 231, 232, 233, by which the RDM 220 instructs the RAN nodes 231, 232, 233 to associate network elements of cells with the configuration of a RAN resource partition. In this example, the resource partition is a resource partition to which the unwanted cell was assigned at the time of its removal from the RAN 100.

As illustrated by blocks 304, 305, 306, the RAN nodes 231, 232, 233 each accomplish a corresponding local association of one or more network elements (NEs) with the configuration of the RAN resource partition. The respective RAN node 231, 232, 233 may locally store that the cells indicated by the received management message are assigned to the configuration of the RAN resource partition and that the RAN node 231, 232, 233 itself is assigned to the configuration of the RAN resource partition.

Subsequently, the RAN nodes 231, 232, 233 each send one or more reports 307, 308, 309 to the RDM 220. For each cell of the RAN resource partition, the reports 307, 308, 309 indicate an amount of traffic of the network slices of the RAN 100. That is to say, the amount of traffic of the network slices is reported on a cell level. However, it is noted that in some scenarios it is also possible that the reporting is omitted for some of the cells. For example, for some of the cells, the configuration of a RAN resource partition could indicate that the cells should be excluded from any optimization, so that reporting is not required for these cells.

The reports may indicate the amount of traffic in terms of one or more counter values. For example, a counter indicating a number of used uplink (UL) physical resource blocks and a counter indicating a number of used downlink (DL) physical resource blocks may be used for this purpose. Accordingly, the reports 307, 308, 309 may distinguish between UL traffic and DL traffic. However, it would also be possible that the reports 307, 308, 309 indicate an overall amount of the traffic, e.g., the sum of UL traffic and DL traffic. The reports 307, 308, 309 may identify the RAN resource partition, e.g., in terms of the partition identifier and/or partition name.

On the basis of the reports, the RDM 220 then optimizes the configurations of the RAN resource partitions as, for example, indicated by block 310. Specifically, the RDM 220 decides on the basis of the amount of the traffic reported for a given cell whether to remove the cell from the configuration of a RAN resource partition. If the amount of traffic in the observation time window is zero or below a threshold, it is likely that the cell is actually not required to provide the required radio coverage for a RAN resource partition, and the RDM 220 removes the cell from the configuration of the RAN resource partition.

In the example of FIG. 3, it is assumed that the report 307 from the RAN node 231 indicated that the amount of traffic was zero for some of the cells controlled by the RAN node 231 for a RAN resource partition, and that the RDM 220 thus decided to remove these cells from the configuration of the RAN resource partition. In order to effect a corresponding adaptation of the configuration of the RAN resource partition, the RDM 220 sends a management message 311 to the RAN node 231 for modifying the configuration of the RAN resource partition. As indicated by block 312, in response to receiving the management message 311, the RAN node 231 locally removes the cells indicated by the management message 311 from the configuration of the RAN resource partition, i.e., releases the assignment of the removed cells to the configuration of the RAN resource partition.

In some scenarios, the removal of the cell(s) from the configuration of a RAN resource partition may also result in removal of all cells controlled by the RAN node 231 from the configuration of the RAN resource partition. That is to say, after removal of the cell(s), no cells controlled by the RAN node 231 remain in the configuration of the RAN resource partition. In such a situation, the RDM 220 may also decide to remove the RAN node 231 from the configuration of the RAN resource partition and indicate this decision in the management message 311. Accordingly, based on the reports 307, 308, 309, the RDM 220 may decide which cell(s) and/or RAN node 231, 232, 233 are to be removed from the configuration of a RAN resource partition.

Figure 4:
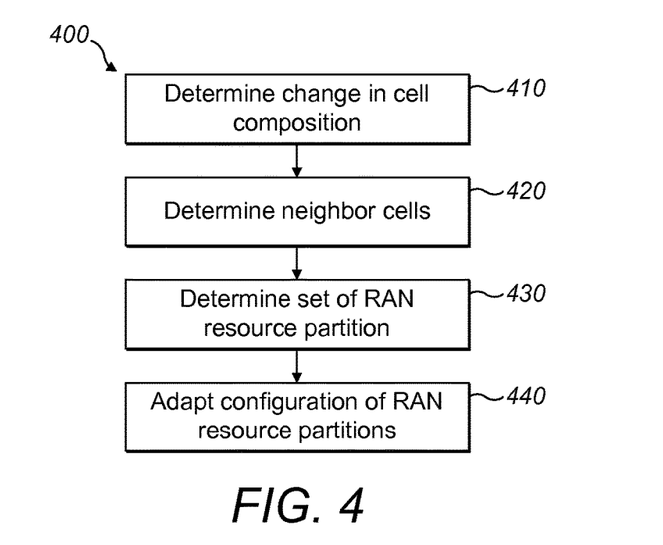
FIG. 4 schematically illustrates a method of managing network slices in a communications network subject to a change in cell composition of the RAN according to an embodiment of the invention.

FIG. 4 shows a flowchart for illustrating a method 400 of managing network slices in a communications network, for example a wireless communications network. The method 400 of FIG. 4 may be utilized for implementing the illustrated concepts in a domain manager of a RAN 100 of a wireless communication network, such as the above-mentioned RDM 220. If a processing circuitry-based implementation of the domain manager is used, the steps of the method 400 may be performed and/or controlled by processing circuitry of a device implementing the domain manager. Such device may also include a memory storing program code for implementing the below described functionalities or steps of the method 400. This is also true for the other methods 500, 600, 700, 800, 900, 1000 that will be described below.

At step 410, the domain manager determines a change in cell composition of the RAN 100. At step 420, the domain manager determines neighbor cells within the RAN 100 affected by the change in cell composition of the RAN 100. At step 430, the domain manager determines a set of RAN resource partitions affected by the change in cell composition of the RAN 100. At step 440, the domain manager adapts the configurations of RAN resource partitions of the set of RAN resource partitions by introducing changes corresponding to the change in cell composition of the RAN 100.

As described above, step 410 sees the domain manager determine a change in cell composition of the RAN 100. As already noted, the change in cell composition may be the addition of a new cell to the RAN 100 or may be the removal of an unwanted cell from the RAN 100. The cell composition defines the cells of the RAN 100, i.e. the coverage sub-areas of the RAN 100. The domain manager may determine a change in cell composition by receiving a trigger from a cell administration function of the domain manager. The change in cell composition of the RAN 100 may be planned (e.g. a change in cell composition that is being planned for instantiation and activation at a later time) or may have already been implemented (e.g. a change in cell composition that has already been instantiated or activated). That is, a notification may be issued by the cell administration function before or after a change in the cell composition of the RAN 100 is activated. In the following description, it is assumed that the change in cell composition of the RAN 100 has already been implemented, although it will be understood that the present invention also covers embodiments where the change in cell composition of the RAN 100 has yet to be implemented.

As described above, step 420 sees the domain manager determine neighbor cells within the RAN 100 affected by the change in cell composition of the RAN 100. This may comprise the domain manager determining a set of cells of the RAN that are neighbor cells of a new cell added to the RAN 100 or a set of cells of the RAN that were neighbor cells of the unwanted cell removed from the RAN 100.

As described above, step 430 sees the domain manager determining a set of RAN resource partitions affected by the change in cell composition of the RAN 100. A RAN resource partition may be affected because an unwanted cell is or was assigned to the configuration of the RAN resource partition and hence the unwanted cell will be or is lost from the configuration of that RAN resource partition. A RAN resource partition may be affected because a new cell is added to the RAN 100 that is then available to be assigned to the configuration of a RAN resource partition.

As described above, step 440 sees the domain manager adapt the configurations of RAN resource partitions of the set of RAN resource partitions by introducing changes corresponding to the change in cell composition of the RAN. A configuration of a RAN resource partition defines the network elements of the RAN 100 that are assigned to the RAN resource partition that is used by a network slice. The network elements assigned to the configuration of a RAN resource partition may include access nodes serving the cells, such as the above mentioned RAN nodes 231, 232, 233. The domain manager may send one or more management messages to RAN nodes. Any such management message(s) may be used to indicate the adapted configuration of one or more RAN resource partitions to the RAN node, like explained for the management messages 311 of FIG. 3. Adapting the configuration of RAN resource partitions by introducing changes corresponding to the change in cell composition of the RAN 100 may include removing an unwanted cell from the configuration of a RAN resource partition or may comprise adding a new cell to the configuration of a RAN resource partition.

Where step 410 sees the domain manager determine the addition of a new cell to the RAN 100, step 420 may then see the domain manager determine a set of cells of the RAN 100 that are neighbor cells of the new cell. The domain manager may continue to determine the set of cells of the RAN 100 that are neighbor cells of the new cell until the set contains at least a minimum number of neighbor cells, for example two, three, four or more neighbor cells. Step 430 may then see the domain manager determining a set of RAN resource partitions affected by the change in cell composition of the RAN 100 because the new cell added to the RAN 100 that is then available to be assigned to the RAN resource partition. The domain manager may determine a set of RAN resource partitions that includes RAN resource partitions to which neighbor cells are assigned. The domain manager may continue to determine a set of RAN resource partitions until the set includes at least a minimum number of RAN resource partitions to which the neighbor cells are assigned, for example two, three, four or more. The domain manager may determine a set of RAN resource partitions that includes all the RAN resource partitions to which some of the neighbor cells of the set of neighbor cells are assigned.

The domain manager may determine a set of RAN resource partitions that includes some of the RAN resource partitions to which all the neighbor cells of the set of neighbor cells are assigned. As a further alternative, the domain manager may determine a set of RAN resource partitions affected by the change in cell composition of the RAN comprises the domain manager determining a set of RAN resource partitions that includes all the RAN resource partitions to which all the neighbor cells of the set of neighbor cells are assigned.

Where step 410 sees the domain manager determine a change in cell composition of the RAN 100 corresponding to the addition of a new cell to the RAN 100, step 440 may then comprise the domain manager adapting the configurations of RAN resource partitions by assigning a network element of the new cell to the configurations of the RAN resource partitions. Advantageously, this allows many RAN resource partitions (and hence the network slices that use these RAN resource partitions) to make use of the new cell added to the RAN 100. The domain manager may adapt the configuration of each RAN resource partition of the set of RAN resource partitions by assigning a network element of the new cell to the configuration of each RAN resource partition in the set of RAN resource partitions.

Where step 410 sees the domain manager determine a change in cell composition of the RAN 100 corresponding to the removal of an unwanted cell from the RAN 100, step 420 may then see the domain manager determine a set of cells of the RAN 100 that are neighbor cells of the unwanted cell. The domain manager may continue to determine the set of cells of the RAN 100 that are neighbor cells of the unwanted cell until the set contains at least a minimum number of neighbor cells, for example two, three, four or more neighbor cells. The domain manager may determine a set of all the cells of the RAN 100 that are neighbor cells of the unwanted cell.

Where step 410 sees the domain manager determine a change in cell composition of the RAN 100 corresponding to the removal of an unwanted cell from the RAN 100, step 430 may then see the domain manager determine a set of RAN resource partitions that includes RAN resource partitions of the unwanted cell. For example, the RAN resource partitions may be RAN resource partitions to which the unwanted cell is assigned or was assigned at the time of its removal. The domain manager may continue to determine a set of RAN resource partitions until the set includes at least a minimum number of RAN resource partitions, for example two, three, four or more. The domain manager may determine a set of RAN resource partitions that includes all the RAN resource partitions of the unwanted cell.

Where step 410 sees the domain manager determine a change in cell composition of the RAN 100 corresponding to the removal of an unwanted cell from the RAN 100, step 440 may then see the domain manager adapt the configurations of RAN resource partitions by assigning a network element of neighbor cells of the set of neighbor cells to the configurations of the RAN resource partitions. The domain manager may adapt the configurations of all the RAN resource partitions in the set of RAN resource partitions by assigning a network element of neighbor cells of the set of neighbor cells to the configurations of the RAN resource partitions. The domain manager may adapt the configurations of RAN resource partitions by assigning a network element of all the neighbor cells of the set of neighbor cells to the configurations of the RAN resource partitions. As a further alternative, the domain manager may adapt the configuration of each RAN resource partition of the set of RAN resource partitions by assigning a network element of each neighbor cell of the set of neighbor cells to the configuration of each RAN resource partition. Advantageously, this provides many new network elements to the RAN resource partition (and hence the network slice that use the RAN resource partition) to use in place of the lost network element from the unwanted cell removed from the RAN 100.

Figure 5:
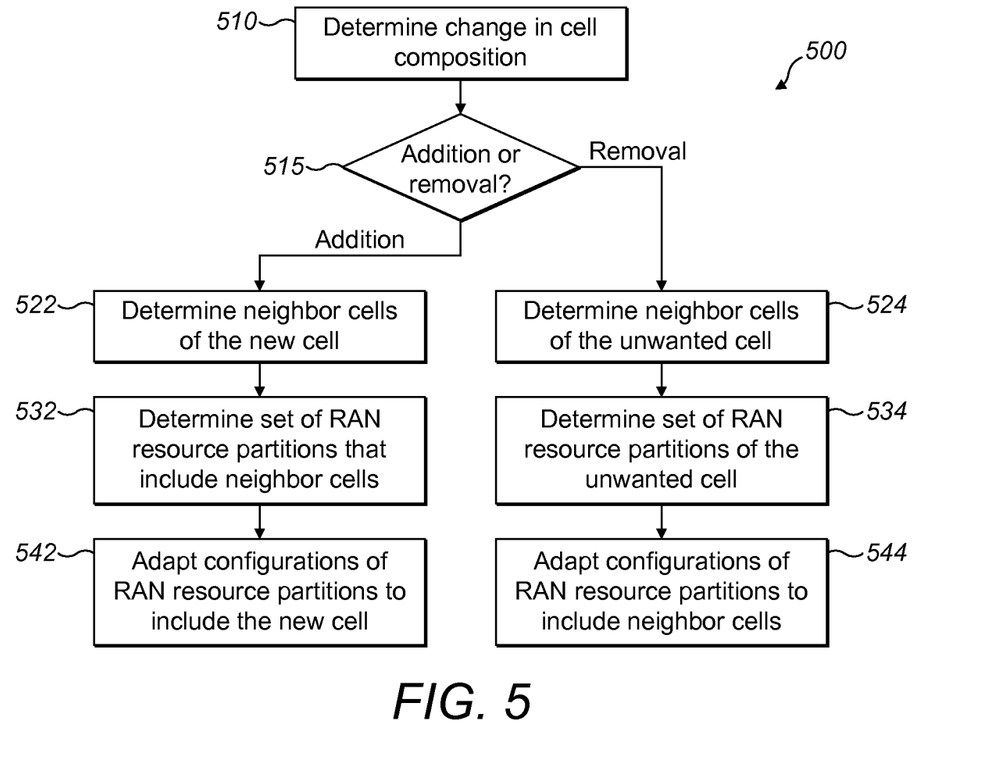
FIG. 5 shows the method of FIG. 4 in more detail.

FIG. 5 shows a flowchart for illustrating a method 500 of managing network slices in a communications network corresponding to that shown in FIG. 4, but illustrates the differences in managing addition and removal of a cell of the RAN 100. Thus, the description of FIG. 4 above applies to FIG. 5 also.

At step 510, the domain manager determines a change in cell composition of the RAN 100, for example by receiving a notification (e.g. trigger) from a cell administration function. At step 515, the domain manager determines whether the change in cell composition of the RAN 100 corresponds to the addition of a new cell to the RAN 100 or the removal of an unwanted cell from the RAN 100. This may be indicated by the notification received from the cell administration function.

If the determination at step 515 indicates an addition of a new cell to the RAN 100, the method proceeds through steps 522, 532, 542 as will be described below. In the alternative, if the determination at step 515 indicates the removal of an unwanted cell from the RAN 100, the method proceeds through steps 524, 534, 544 as will be described below.

When the addition of a new cell to the RAN 100 has been determined, the domain manager determines a set of cells of the RAN 100 that are neighbor cells of the new cell at step 522. At step 532, the domain manager determines a set of RAN resource partitions that includes RAN resource partitions to which neighbor cells of the set of neighbor cells are assigned. At step 534, the domain manager adapts the configuration of RAN resource partitions by assigning a network element of the new cell to the configuration of the RAN resource partitions.

When the removal of an unwanted cell from the RAN 100 has been determined, the domain manager determines a set of cells of the RAN 100 that are neighbor cells of the unwanted cell at step 524. At step 534, the domain manager determines a set of RAN resource partitions that includes RAN resource partitions of the unwanted cell. For example, the resource partitions may be the RAN resource partitions to which the unwanted cell was assigned at the time of its removal from the RAN 100. At step 536, the domain manager adapts the configuration of RAN resource partitions by assigning a network element of the set of neighbor cells to the configuration of the RAN resource partitions.

Figure 6:
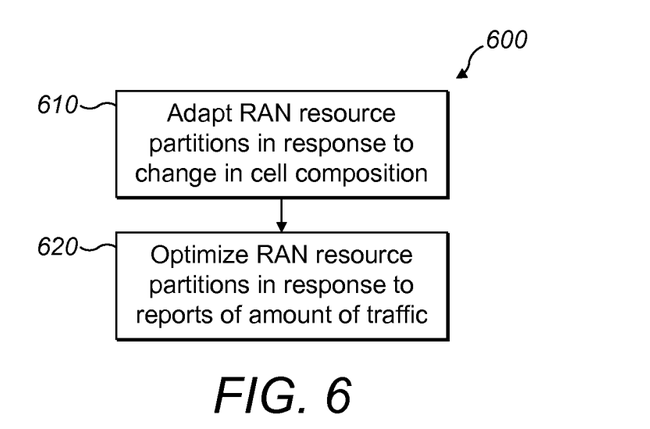
FIG. 6 schematically illustrates a method of managing network slices in a communications network subject to a change in cell composition of the RAN according to another embodiment of the invention.

FIG. 6 shows a method 600 of managing network slices in a communications in response to a change in cell composition of the RAN 100. As will be seen from FIG. 6, the method can be essentially viewed as comprising two parts.

At step 610, the configurations of RAN resource partitions are adapted in response to the change in cell composition of the RAN 100. Step 610 may, for example, comprise the method of FIG. 4 or 5.

At step 620, the configurations of RAN resource partitions are optimized (i.e. adapted) in response to reports of the amount of traffic seen by cells within the network slices of the RAN 100. Step 620 may comprise the domain manager receiving reports indicating an amount of traffic of the network slice handled by a network element assigned to the configuration of a RAN resource partition in an observation time window. The observation time window may be configurable. Based on the reports, the domain manager may adapt the configuration of the RAN resource partition by removing the network element from the configuration of the RAN resource partition. The network element removed from the RAN resource partition may be a network element of a new cell added to the RAN 100. Alternatively, the network element removed from the RAN resource partition may be a network element added to the RAN resource partition that is a network element of a neighbor cell of an unwanted cell removed from the RAN 100. Also, the network element removed from the RAN resource partition may be an existing network element present in the RAN resource partition before the change in cell composition of the RAN 100.

For example, by adding a network element of a new cell to the configurations of many RAN resource partitions, it may be found that some network slices make little if any use of the new cell. These network slices may see the network element removed from the configuration of the RAN resource partition the network slice uses. Alternatively, adding a network element of a new cell to the configuration of a RAN resource partition may result in a substantial reduction on the network traffic passing through an existing network element of the RAN resource partition. In this case, the existing network element may be removed from the configuration of the RAN resource partition, which may make it available to be added to the configuration of another RAN resource partition that requires an additional network element. Nonetheless, adding the new cell to the configurations of many RAN resource partitions is advantageous as it allows the domain manager to determine an optimum allocation of the new cell from the reports it receives. That is, advantageously, network slices making frequent use of the new cell may retain its network element in their configurations, while network slices making infrequent use of the new cell may drop its network element from their configurations.

As a further example, by adding the network elements of many neighbor cells to the configuration of the RAN resource partition of an unwanted cell removed from the RAN 100, it may be found that the network slice makes little if any use of some of these network elements. These underused network elements may then be removed from the configuration of the RAN resource partition that the network slice uses. Providing the network slice that has lost the unwanted cell with many network elements from neighbor cells advantageously allows the domain manager to determine an optimum allocation of the network elements from the neighbor cells from the reports it receives. That is, advantageously, the neighbor cells frequently used by the network slice may be retained in the configuration of the RAN resource partition, while the neighbor cells infrequently used by the network slice may be dropped from the configuration of the RAN resource partition. In addition, adding network elements from the neighbor cells to the configuration of the RAN resource partition may result in a substantial reduction on the network traffic passing through an existing network element of the RAN resource partition. In this case, the existing network element may be removed from the configuration of the RAN resource partition, which may make it available to be added to the configuration of another RAN resource partition that requires an additional network element.

Thus, advantageously, a change in cell composition of the RAN 100, either because of the addition on a new cell or the removal of an unwanted cell, results in the domain manager adapting the configurations of RAN resource partitions in a way that ensures the RAN 100 is configured in a flexible way. This initial adaptation in combination with the ongoing adaptation of the configuration of a RAN resource partition by removing network elements as a result of monitoring the amount of traffic handled by the network elements of the RAN is in-line with the self-learning requirements for 5G.

Step 620 may comprise the domain manager removing the network element from the configuration of the RAN resource partition when the reports indicate that the amount of traffic of the network slice handled by the network element for that RAN resource partition is below a threshold value. The threshold value may be configurable. The domain manager may remove the network element when the reports indicate that the amount of the traffic handled by the network element is zero. The reports may comprise an identifier of the RAN resource partition.

In step 620, the network element removed by the domain manager may comprise a cell and an access node serving the cell. The domain manager may send a management message to the access node serving the cell, the management message causing the access node to locally release an assignment of the cell to the configuration of the RAN resource partition. Step 620 may comprise the domain manager removing the access node from the configuration of the RAN resource partition when removing the cell results in the access node no longer serving any cells in the RAN resource partition. In response to removing the access node from the configuration of the RAN resource partition, the domain manager may send a management message to the access node, the management message causing the access node to locally release an assignment of the access node to the configuration of the RAN resource partition.

Step 610 of FIG. 6 that comprises adapting configurations of RAN resource partitions will now be described in more detail with reference to FIG. 7.

Figure 7:
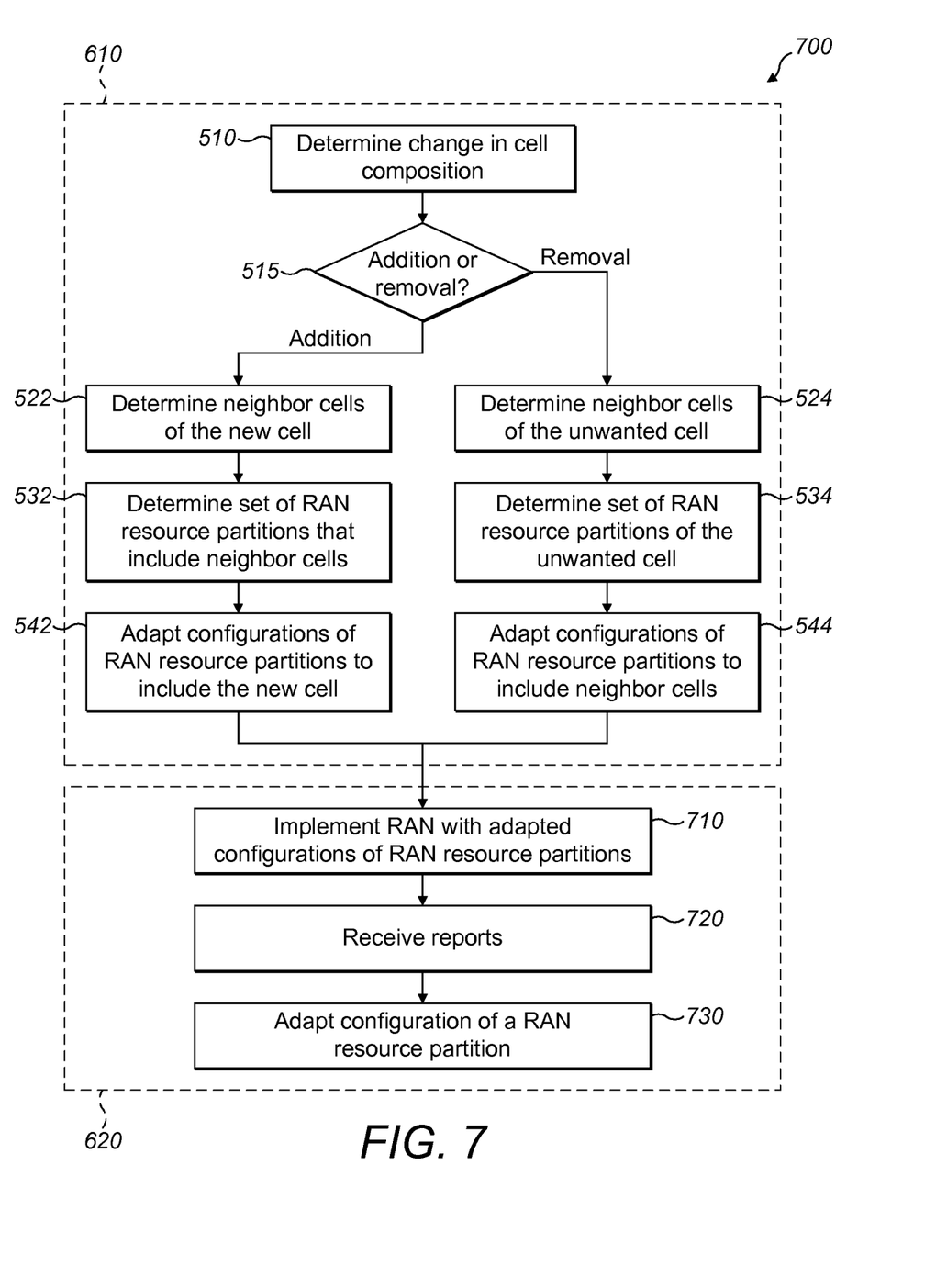
FIG. 7 shows the method of FIG. 4 in more detail.

A method 700 of managing network slices in a communications network is shown in FIG. 7. Step 610 comprises the method 500 set out in FIG. 5, and so will not be described again. It will be remembered that the method 500 ends with the domain manager either adapting the configurations of RAN resource partitions to include a new cell added to the RAN 100 as shown at step 542 or adapting the configurations of RAN resource partitions to include neighbor cells of the unwanted cell removed from the RAN 100 as shown at step 544.

Then, at step 710, the domain manager implements the RAN 100 with the adapted configurations of the RAN resource partitions, i.e. the RAN 100 with the adapted configurations of the RAN resource partitions is instantiated and activated.

Next, at step 720, the domain manager receives reports. As explained for the reports 307, 308, 309 of FIG. 3, the reports may be received from one or more RAN nodes 231, 232, 233. The reports indicate, for at least one of the network elements assigned to a RAN resource partition, an amount of traffic of the network slice handled by the network element in an observation time window. As a general rule, a longer observation time window may be selected in scenarios where the traffic of a network slice is expected to occur only sparsely, e.g., when a network slice is used to provide a service in an event location which is used on a weekly basis. A shorter observation time window may be sufficient if the traffic of a network slice is expected to occur more densely, e.g., when a network slice is used to provide a vehicle diagnostic service in an area of a heavily used road. The reports may include an identifier of the RAN resource partition, such as the above-mentioned partition name and/or partition identifier.

At step 730, the domain manager adapts the configuration of a RAN resource partition by removing one or more of the network elements from the configuration of the RAN resource partition. This is accomplished based on the reports received at step 720. The domain manager may remove those network elements from the configuration of the RAN resource partition for which the reports indicate that the amount of the traffic handled by the network element is below a threshold value. The threshold value may be configurable. For example, a low threshold value may be used in scenarios where the traffic of the network slice is expected to occur only sparsely. A higher threshold value may be used if the traffic of the network slice is expected to occur more densely. In some scenarios, the domain manager may remove those network elements from the configuration of the RAN resource partition for which the reports indicate that the amount of the traffic handled by the network element is zero, i.e., which handled no traffic.

Figure 8:
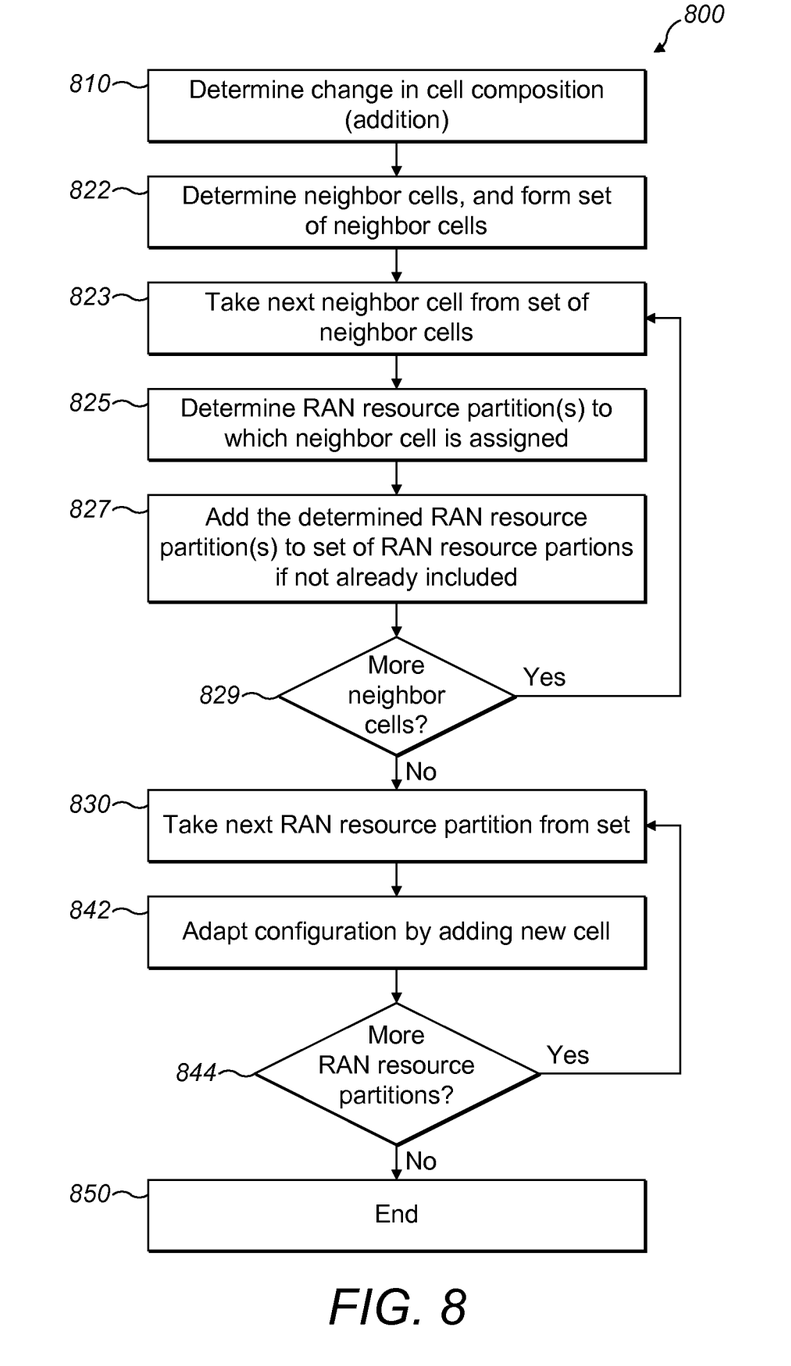
FIG. 8 shows a flowchart for schematically illustrating a method of managing network slices in a communications network subject to an addition of a new cell to the RAN which may be used in the methods of FIGS. 4 to 7.

FIG. 8 shows a flowchart for schematically illustrating a method 800 of managing network slices in a communications network subject to the addition of a new cell which may be used in the methods of FIGS. 4 to 7. The method 800 may correspond to step 610 of FIG. 6.

The method 800 starts at step 810 where the domain manager determines that a new cell has been added to the RAN 100. At step 822, the domain manager determines all the neighbor cells, i.e. all the existing cells of the RAN 100 that have become neighbor cells to the new cell added to the RAN 100. The domain manager also forms a set of neighbor cells at step 822, with the set including all the neighbor cells determined in this way.

At step 823, the domain manager takes the next neighbor cell provided in the set of neighbor cells formed in step 822. When step 823 is first performed, the next neighbor cell will be the first neighbor cell listed in the set; when step 823 is performed for the second time, the next neighbor cell will be the second neighbor cell listed in the set; and so on.

At step 825, the domain manager determines the RAN resource partitions to which the currently selected neighbor cell has been assigned. The neighbor cell may be assigned to any number of RAN resource partitions, for example zero, one, two, three or more.

At step 827, the domain manager compares each of the RAN resource partitions determined at step 825 to a set of RAN resource partitions: if a RAN resource partition is not already included in the set, the domain manager adds the RAN resource partition to that set. The first time step 827 is performed, the set of RAN resource partitions may not yet exist, in which case the domain manager creates such a set and begins adding RAN resource partitions to the set.

At step 829, the domain manager performs a check to see if further neighbor cells from the set of neighbor cells require processing. If the answer is yes, the method 800 loops back to step 823 where the next neighbor cell is selected by the domain manager. Steps 825 to 829 are then repeated by the domain manager. In this way, the domain manager will process each neighbor cell from the set of neighbor cells and will form a set of RAN resource partitions that includes all RAN resource partitions to which the neighbor cells have been assigned.

When all neighbor cells from the set of neighbor cells have been processed in steps 823 to 827, the test applied at step 829 will result in a no outcome. In this case, the method 800 will cease to loop through steps 823 to 829 and will instead continue to step 830.

At step 830, the domain manager selects the next RAN resource partition from the set of RAN resource partitions formed in step 827. When step 830 is first performed, the next RAN resource partition will be the first RAN resource partition listed in the set; when step 830 is performed for the second time, the next RAN resource partition will be the second RAN resource partition listed in the set; and so on.

At step 842, the configuration of the currently selected RAN resource partition is adapted by adding a network element of the new cell added to the RAN 100. At step 844, the domain manager determines if all RAN resource partitions from the set of RAN resource partitions have been processed. If the answer is no, the method 800 loops back to step 830 where the next RAN resource partition from the set of RAN resource partitions is selected. Steps 830, 842 and 844 are then repeated by the domain manager. In this way, the domain manager will process each RAN resource partition from the set of RAN resource partitions and will add the new cell to the configuration of each of the RAN resource partitions in the set of RAN resource partitions.

When all RAN resource partitions have been processed, the outcome of test 844 is no and the method ends at step 850. When the method has ended at step 850, the domain manager will have assigned the new cell to the configuration of each RAN resource partition served by at least one of the neighbor cells. The new cell is made available to the RAN resource partitions making use of the neighbor nodes, i.e. the new cell is made available to the RAN resource partitions (and hence network slices) that are most likely to make use of the new cell. This is because the new cell is most likely to have been added to the RAN due to high demand for use of the neighbor cells by the network slices they serve. If any RAN resource partition does not make use of the new cell added to the RAN 100, the new cell may be removed from the configuration of that RAN resource partition during the subsequent optimization step, for example step 620 of FIG. 6.

Figure 9:
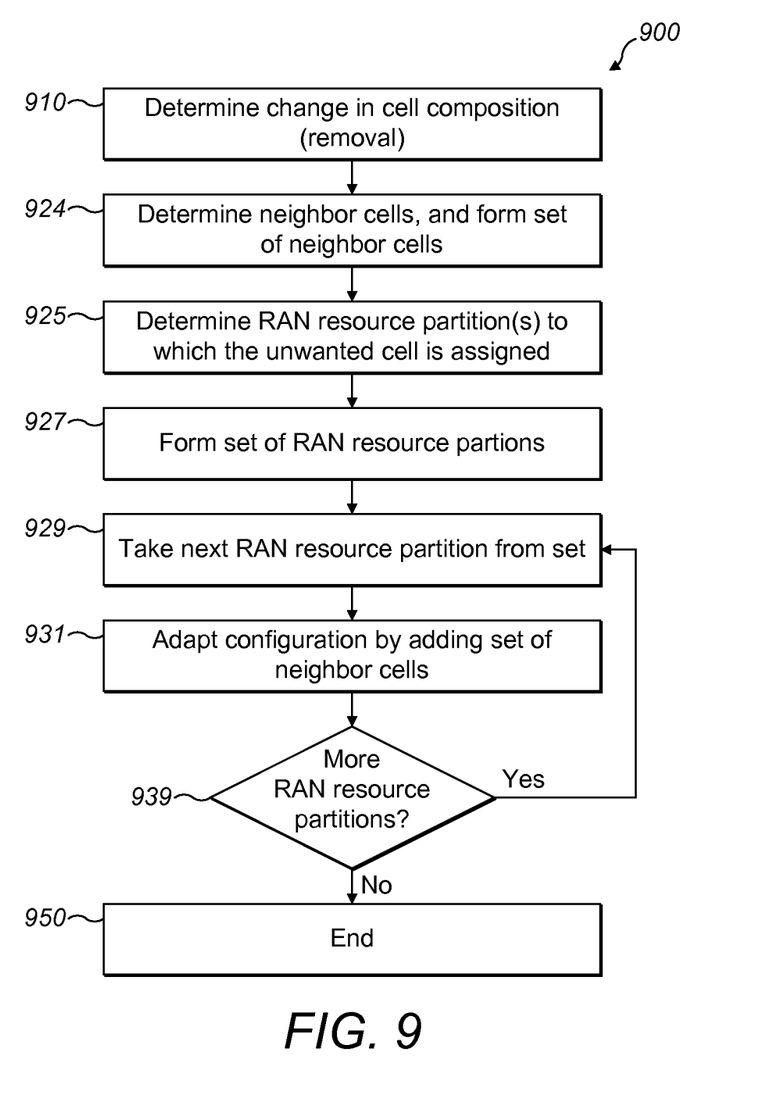
FIG. 9 shows a flowchart for schematically illustrating a method of managing network slices in a communications network subject to a removal of an unwanted cell from the RAN which may be used in the methods of FIGS. 4 to 7.

FIG. 9 shows a flowchart for schematically illustrating a method 900 of managing network slices in a communications network subject to the removal of an unwanted cell from the RAN 100 which may be used in the methods 400, 500, 600, 700 of FIGS. 4 to 7. The method 900 may correspond to step 610 of FIG. 6.

The method 900 starts at step 910 where the domain manager determines the removal of an unwanted cell from the RAN 100. At step 924, the domain manager determines all the neighbor cells, i.e. all the existing cells of the RAN 100 that were the neighbor cells of the unwanted cell removed from the RAN 100. The domain manager also forms a set of neighbor cells at step 822, with the set including all the neighbor cells determined in this way.

At step 925, the domain manager determines the RAN resource partitions to which the unwanted cell was assigned at the time of its removal from the RAN 100. The unwanted neighbor cell may have been assigned to the configurations of any number of RAN resource partitions, for example zero, one, two, three or more. At step 927, the domain manager forms a set of RAN resource partitions that includes each of the RAN resource partitions determined at step 925.

At step 929, the domain manager selects the next RAN resource partition from the set of RAN resource partitions formed in step 927. When step 929 is first performed, the next RAN resource partition will be the first RAN resource partition listed in the set; when step 929 is performed for the second time, the next RAN resource partition will be the second RAN resource partition listed in the set; and so on.

At step 931, the configuration of the currently selected RAN resource partition is adapted by adding a network element of each neighbor cell from the list of neighbor cells formed in step 924. At step 939, the domain manager determines if all RAN resource partitions from the set of RAN resource partitions have been processed. If the answer is no, the method 900 loops back to step 929 where the next RAN resource partition from the set of RAN resource partitions is selected. Steps 929, 931 and 939 are then repeated by the domain manager. In this way, the domain manager will process each RAN resource partition from the set of RAN resource partitions and will add the neighbor cells to the configuration of the RAN resource partitions in the set of RAN resource partitions.

When all RAN resource partitions have been processed, the outcome of test 939 is no and the method ends at step 950. When the method has ended at step 950, the domain manager will have assigned all the neighbor cells to the configuration of each RAN resource partition previously served by the unwanted cell removed from the RAN. If no action is taken, the loss of the unwanted cell from the RAN resource partition(s) to which it was assigned may result in a breach of an SLA(s) for the network slice(s). The method 900 ensures that the loss of the unwanted cell from the RAN resource partition(s) is adequately compensated by providing use of all the neighbor cells to the RAN resource partition(s). If the RAN resource partition(s) does not make use of one of the neighbor cells, that neighbor cell may be removed from the configuration of the RAN resource partition during the subsequent optimization step, for example step 620 of FIG. 6.

Figure 10:
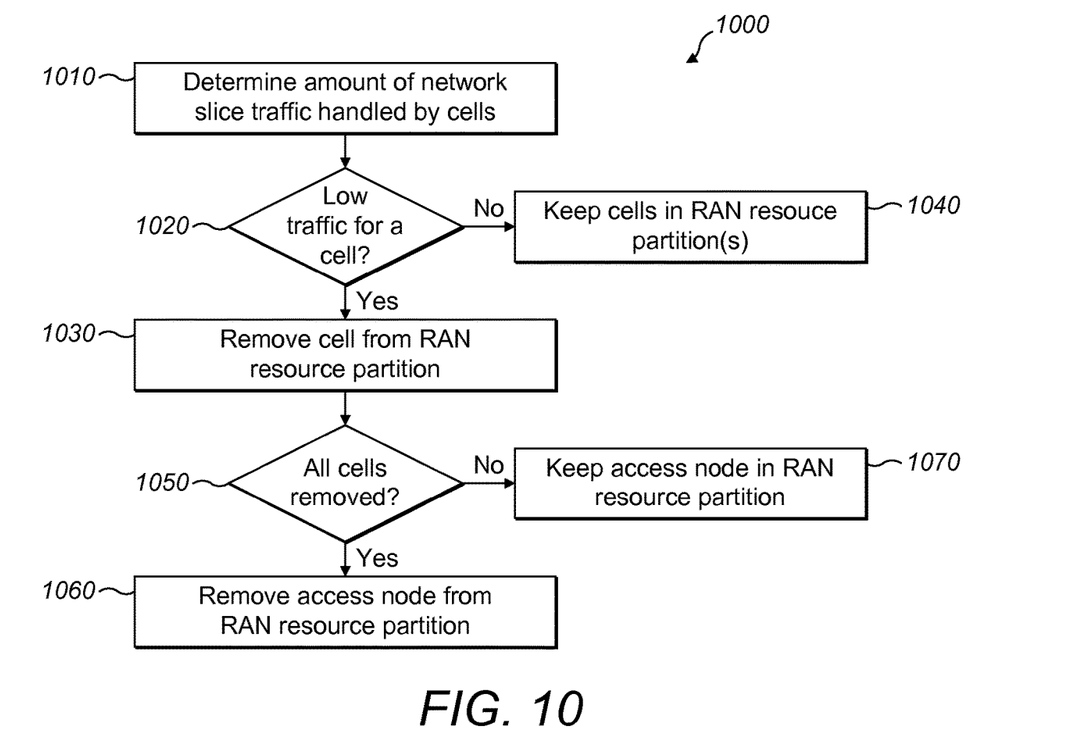
FIG. 10 shows a flowchart for schematically illustrating a method of optimizing the configuration of RAN resource partitions after a change in cell composition of the RAN which may be used in the methods of FIGS. 4 to 7.

FIG. 10 shows a method 1000 which may be used to implement the further adaptation of the configuration of the RAN resource partition in step 620 of FIG. 6 and, in particular, step 730 of FIG. 7. This method 1000 may be performed after the methods 800, 900 of FIGS. 8 and 9.

At step 1010, the domain manager may use the received reports to determine the amount of traffic for network elements (such as cells) for each of the RAN resource partitions they serve. The cells are assumed to be served by respective access nodes, e.g., the above-mentioned RAN nodes 231, 232, 233. The cells may include cells that were newly assigned to the configuration of a RAN resource partition(s) during step 610 of FIG. 6 and/or cells that were already assigned to the configuration of a RAN resource partition(s) prior to step 610.

At step 1020, the domain manager determines if the amount of the traffic is low for any cell for a RAN resource partition it serves, e.g., zero or below a threshold. As mentioned above, this threshold may be configurable. The cell may be a cell that was newly assigned to the configuration of the RAN resource partition during step 610 of FIG. 6, or the cell may be a cell that was already assigned to the configuration of the RAN resource partition prior to step 610. If the amount of the traffic is found to be low for a cell, the method 1000 proceeds to step 1030. Otherwise, the method 1000 proceeds to step 1040.

At step 1030, the domain manager removes the cell for which traffic is low from the configuration of the RAN resource partition for which it is seeing low traffic. In response to removing the cell from the configuration of this RAN resource partition, the domain manager may send a management message to the access node serving the cell, for example a message like the message 311 shown in FIG. 3. The management message causes the access node locally to release an assignment of the cell to the configuration of the RAN resource partition. At step 1040, the domain manager keeps the cell in the configuration of the RAN resource partition.

At step 1050, the domain manager may check if, after removal of the cell at step 1040, there are any remaining cells served by the access node in the configuration of the RAN resource partition for which it is seeing low traffic, i.e., if all cells served by the access node were removed from the configuration of the RAN resource partition. If all cells are found to be removed, the method proceeds to step 1060. Otherwise, the method 1000 proceeds to step 1070.

At step 1060, the domain manager removes the access node from the configuration of the RAN resource partition. Accordingly, in response to removing all of the cells served by one of the access nodes for a particular RAN partition, the domain manager may also remove this access node from the configuration of that RAN resource partition. In response to removing the access node from the configuration of the RAN resource partition, the domain manager may send a management message to the access node. An example of such management message is the above-mentioned management message 311 of FIG. 3. The management message causes the access node locally to release an assignment of the access node to the configuration of the RAN resource partition. At step 1070, if there are cells served by the access node remaining in the configuration of the RAN resource partition, the domain manager keeps the access node in the configuration of the RAN resource partition.

Figure 11:
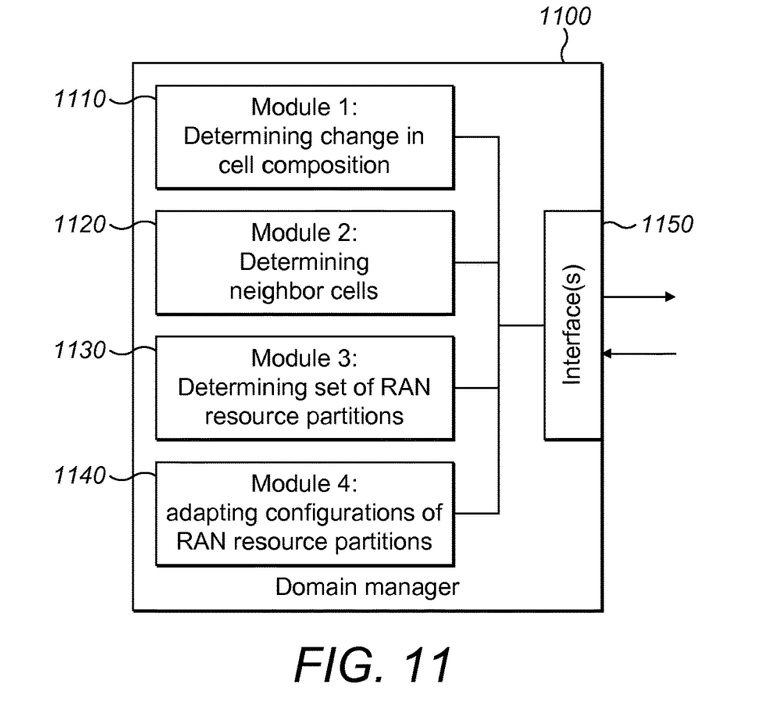
FIG. 11 schematically illustrates a domain manager according to an embodiment of the invention.

FIG. 11 shows a block diagram for illustrating functionalities of a domain manager 1100 which may perform any of the methods that are described above and that are illustrated in any of FIGS. 4 to 10. As illustrated, the domain manager 1100 may be provided with a module 1110 configured to determine a change in cell composition in the RAN 100, such as explained in connection with step 410 of FIG. 4. Further, the domain manager 1100 may be provided with a module 1120 configured to determine neighbor cells, such as explained in connection with step 430 of FIG. 4. Further, the domain manager 1100 may be provided with a module 1130 configured to determine a set of RAN resource partitions, such as explained in connection with step 440 of FIG. 4. Further, the domain manager 1100 may be provided with a module 1140 configured to adapt the configurations of RAN resource partitions, such as explained in connection with step 440 of FIG. 4.

The domain manager 1100 may also comprise one or more interfaces 1150 for connecting to the network and via said network to other elements of the network. Although FIG. 11 illustrates one embodiment in which the components of the domain manager 1100 are connected to a bus it would be clear for a person skilled in the art that alternative embodiments are also possible, e.g. connecting the components in series.

It is noted that the domain manager 1100 may include further modules for implementing other functionalities, such as known functionalities of a radio domain manager. Further, it is noted that the modules of the domain manager 1100 do not necessarily represent a hardware structure of the domain manager 1100, but may also correspond to functional elements, e.g., implemented by hardware, software, or a combination thereof.

Figure 12:
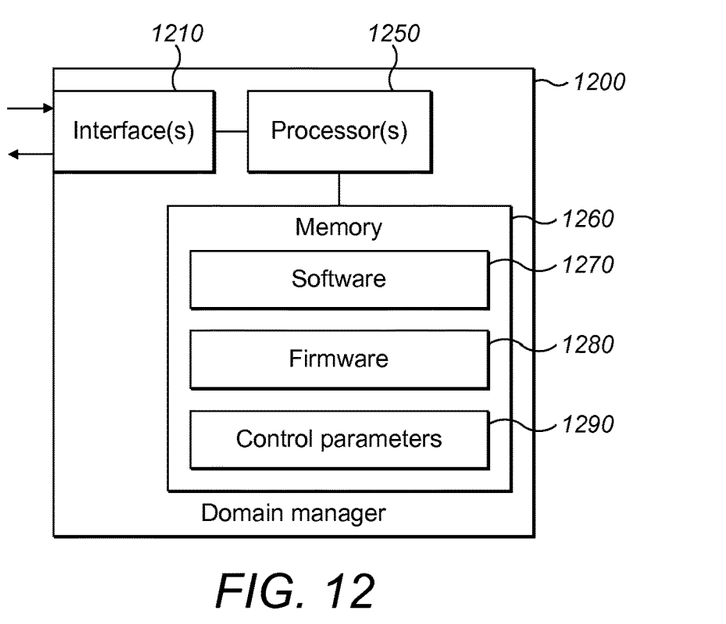
FIG. 12 schematically illustrates a domain manager according to an embodiment of the invention.

FIG. 12 illustrates a processing circuitry-based implementation of a domain manager 1200 which may be used for performing any of the methods that are described above and that are illustrated in any of FIGS. 4 to 10. For example, the structures as illustrated in FIG. 12 may be used for implementing the RDM 220 or the domain manager 1100.

As illustrated, the domain manager 1200 may include one or more interfaces 1210 for communicating with RAN nodes or with other nodes of a wireless communication network, e.g., such as the NMS 210. The interface(s) 1210 may be used for receiving the above-mentioned reports from the RAN nodes 231, 232, 233 or for sending the above-mentioned management messages to the RAN nodes 231, 232, 233.

Further, the domain manager 1200 may include processing circuitry coupled to the interface(s) 1210. The processing circuitry may include one or more processors 1250 and a memory 1260 coupled to the processor(s) 1250. By way of example, the interface(s) 1210, the processor(s) 1250, and the memory 1260 could be coupled by one or more internal bus systems of the domain manager 1200. The memory 1260 may include a Read-Only-Memory (ROM), e.g., a flash ROM, a Random Access Memory (RAM), e.g., a Dynamic RAM (DRAM) or Static RAM (SRAM), a mass storage, e.g., a hard disk or solid state disk, or the like. As illustrated, the memory 1260 may include software 1270, firmware 1280, and/or control parameters 1290. The memory 1260 may include suitably configured program code to be executed by the processing circuitry so as to implement the above-described functionalities of a domain manager, such as explained in connection with FIG. 4.

It is to be understood that the structures as illustrated in FIG. 12 are merely schematic and that the domain manager 1200 may actually include further components which, for the sake of clarity, have not been illustrated, e.g., further interfaces. The components of the domain manager 1200 may be connected in series or to a bus, or in some other way. Also, it is to be understood that the memory 1260 may include further program code for implementing known functionalities of a radio domain manager. According to some embodiments, also a computer program may be provided for implementing functionalities of the domain manager 1200, e.g., in the form of a physical medium storing the program code and/or other data to be stored in the memory 1260 or by making the program code available for download or by streaming.

It is to be understood that the examples and embodiments as explained above are merely illustrative and susceptible to various modifications. For example, the illustrated concepts may be applied in connection with various kinds of wireless communication technologies, without limitation to the above-mentioned examples of the LTE or NR technology. Moreover, it is to be understood that the above concepts may be implemented by using correspondingly designed software to be executed by processing circuitry of an existing device, or by using dedicated device hardware. Further, it should be noted that the illustrated nodes or devices may each be implemented as a single device or as a system of multiple interacting devices.

The invention claimed is:

1. A method, performed by a domain manager of a radio access network (RAN), of managing network slices in a communications network, the method comprising:
   determining a change in cell composition of the RAN, wherein the change in cell composition includes at least one of an addition of a new cell and a removal of an unwanted cell;
   determining at least one of the following within the RAN:
     a first set of neighbor cells of the new cell,
     a second set of neighbor cells of the unwanted cell;
   determining at least one of the following:
     a first set of RAN resource partitions that include neighbor cells of the first set, and
     a second set of RAN resource partitions that include the unwanted cell,
   wherein the at least one of the first and second sets of RAN resource partitions are assigned to a network slice of the communication network; and
   adapting one or more configurations of the at least one of the first and second sets of RAN resource partitions based on at least one of the following:
     assigning a network element serving the new cell to configurations of the first set of RAN resource partitions, and
     assigning one or more network elements serving the second set of neighbor cells to the configurations of the second set of RAN resource partitions.

2. The method of claim 1, wherein determining the first set of neighbor cells comprises selecting all the cells of the RAN that are neighbor cells of the new cell.

3. The method of claim 1, wherein determining the first set of RAN resource partitions comprises selecting all RAN resource partitions to which neighbor cells of the first set are assigned.

4. The method of claim 1, wherein determining the second set of neighbor cells comprises selecting all cells of the RAN that are neighbor cells of the unwanted cell.

5. The method of claim 1, wherein determining the second set of RAN resource partitions composition comprises selecting all RAN resource partitions that include the unwanted cell.

6. The method of claim 1 wherein determining at least one of the first and second sets of neighbor cells, determining at least one of the first and second sets of RAN resource partitions, and adapting the one or more configurations of the at least one of the first and second sets of RAN resource partitions, are performed in response to receiving a trigger from a cell administration function.

7. The method of claim 1, further comprising:
   receiving reports indicating an amount of traffic, of the network slice in an observation time window, handled by a network element assigned to a configuration of a particular RAN resource partition of at least one of the first and second sets; and
   based on the reports, adapting the configuration of the particular RAN resource partition by removing the network element from the configuration of the particular RAN resource partition.

8. A domain manager for a Radio Access Network (RAN) of a communications network, the domain manager comprising:
   processing circuitry and a memory containing instructions executable by said processing circuitry whereby said domain manager is operative to:
     determine a change in cell composition of the RAN, wherein the change in cell composition includes at least one of an addition of a new cell and a removal of an unwanted cell;
     determine at least one of the following within the RAN:
       a first set of neighbor cells of the new cell,
       a second set of neighbor cells of the unwanted cell;
     determine at least one of the following:
       a first set of RAN resource partitions that include neighbor cells of the first set, and
       a second set of RAN resource partitions that include the unwanted cell,
     wherein the at least one of the first and second sets of RAN resource partitions are assigned to a network slice of the communication network; and
     adapt one or more configurations of the at least one of the first and second sets of RAN resource partitions based on at least one of the following:

assigning a network element serving the new cell to configurations of the first set of RAN resource partitions, and assigning one or more network elements serving the second set of neighbor cells to the configurations of the second set of RAN resource partitions.

9. The domain manager of claim 8, wherein the domain manager is further operable, based on execution of the instructions by the processing circuitry, to determine the first set of neighbor cells by selecting all cells of the RAN that are neighbor cells of the new cell.

10. The domain manager of claim 8, wherein the domain manager is further operable, based on execution of the instructions by the processing circuitry, to determine the first set of RAN resource partitions by selecting all RAN resource partitions to which neighbor cells of the affected set are assigned.

11. The domain manager of claim 8, wherein the domain manager is further operable, based on execution of the instructions by the processing circuitry, to determine the second set of neighbor cells by selecting all cells of the RAN that are neighbor cells of the unwanted cell.

12. The domain manager of claim 8, wherein the domain manager is further operable, based on execution of the instructions by the processing circuitry, to:

receive reports indicating an amount of traffic, of the network slice in an observation time window, handled by a network element assigned to a configuration of particular RAN resource partition of at least one of the first and second sets; and based on the reports, adapt the configuration of the particular RAN resource partition by removing the network element from the configuration of the particular RAN resource partition.

13. A non-transitory, computer-readable medium storing computer-executable instructions that, when executed by processing circuitry, cause a domain manager of a radio access network (RAN) to perform operations corresponding to the method of claim 1.

* * * * *